United States Patent [19]

Narisada et al.

[11] Patent Number: 5,896,094
[45] Date of Patent: Apr. 20, 1999

[54] KEYLESS ENTRY SYSTEM

[75] Inventors: Yuko Narisada, Zama; Nobuhiro Amano, Ebina; Takashi Yoshizawa, Sagamihara, all of Japan

[73] Assignee: Nissan Motor Co., Ltd., Yokohama, Japan

[21] Appl. No.: 08/628,210

[22] Filed: Apr. 5, 1996

[30] Foreign Application Priority Data

Apr. 20, 1995 [JP] Japan ..................... 7-095617

[51] Int. Cl.⁶ .................. G08C 19/00; G05B 19/00
[52] U.S. Cl. .................. 340/825.31; 340/825.34; 340/825.69; 340/825.72; 307/9.1; 307/10.2; 180/287; 384/4; 384/23
[58] Field of Search .............. 340/825.31, 825.34, 340/825.69, 825.72, 426, 825.3; 307/9.1, 10.2, 10.5, 10.4; 180/287; 70/278, 237; 380/4, 23

[56] References Cited

U.S. PATENT DOCUMENTS 5,412,379  5/1995  Waraksa et al. ............. 340/825.72
5,525,977  6/1996  Suman ........................ 340/825.25
5,635,923  6/1997  Steele et al. ................. 340/905

*Primary Examiner*—Michael Horabik
*Assistant Examiner*—Yonel Beaulieu
*Attorney, Agent, or Firm*—Foley & Lardner

[57] ABSTRACT

A keyless entry system for use with a mobile transmitter for transmitting an ID code specified therefor along with a command for vehicle door lock/unlock remote control to a control unit. The control unit is operable in an ID code registration mode for registering an ID code transmitted from the mobile transmitter. The transmitted ID code is compared with the registered ID code to permit the remote control specified by the transmitted command when the transmitted ID code is identical with the registered ID code. Upon completion of a first predetermined procedure including a plurality of sequential events of at least one first movable vehicle member provided on the vehicle, a second movable vehicle member is changed from a first position to a second position. The control unit is placed in the ID code registration mode upon the sequential occurrence of three events of (1) the second movable member is changed to the second position, (2) the ignition key is placed in a predetermined position within the key receptacle and (3) the second movable member is returned to the first position in this order.

9 Claims, 5 Drawing Sheets

KEYLESS ENTRY SYSTEM

BACKGROUND OF THE INVENTION

This invention relates to a keyless entry system for vehicles door lock or unlock remote control.

Keyless entry systems have been used for vehicle door lock/unlock control at a position remote from the vehicle. Such a conventional keyless entry system is used with a mobile transmitter of the type having door lock/unlock buttons for transmitting a function code causing the vehicle doors to be locked or unlocked when depressed at a position remote from the vehicle. The keyless entry system has a keyless entry control unit which permits the remote control only when the ID code transmitted along with the function code from the mobile transmitter is identical with the ID code registered therein. If the transmitted and registered ID codes are not identical, however, the remote control is terminated with no door lock/unlock operation. For this reason, it takes much time to confirm which one of the mobile transmitter and the keyless entry control unit is subject to failure.

SUMMARY OF THE INVENTION

It is a main object of the invention to provide an improved keyless entry system which permits operator's easy confirmation as to whether a trouble occurs in the mobile transmitter or the keyless entry control unit.

There is provided, in accordance with the invention, a keyless entry system for use with an automotive vehicle. The keyless entry system comprises a mobile transmitter for transmitting a command signal including an ID code specified therefor along with a function code for vehicle door lock/unlock remote control, and a control unit for receiving the command signal transmitted from the mobile transmitter. The control unit includes means for comparing the received ID code with an ID code registered therein to permit the remote control specified by the received function code when the received function code is correct and the received and registered ID codes are identical, and means for providing an indication when the received and registered ID codes are not identical.

In another aspect of the invention, the keyless entry system comprises a mobile transmitter for transmitting a command signal including an ID code specified therefor along with a function code for vehicle door lock/unlock remote control, and a control unit for receiving the command signal transmitted from the mobile transmitter. The control unit includes means for comparing the received ID code with an ID code registered therein to permit the remote control specified by the received function code when the received function code is correct and the received and registered ID codes are identical, and means for providing an indication upon reception of the command signal transmitted from the mobile transmitter. In still another aspect of the invention, the keyless entry system comprises a mobile transmitter for transmitting a command signal including an ID code specified therefor along with a function code for vehicle door lock/unlock remote control, and a control unit for receiving the command signal transmitted from the mobile transmitter. The control unit includes means for comparing the received ID code with an ID code registered therein to permit the remote control specified by the received function code when the received and registered ID codes are identical. The keyless entry system also includes a receiver unit for receiving the command signal transmitted from the mobile transmitter. The receiver unit includes means for providing an indication upon reception of the command signal.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
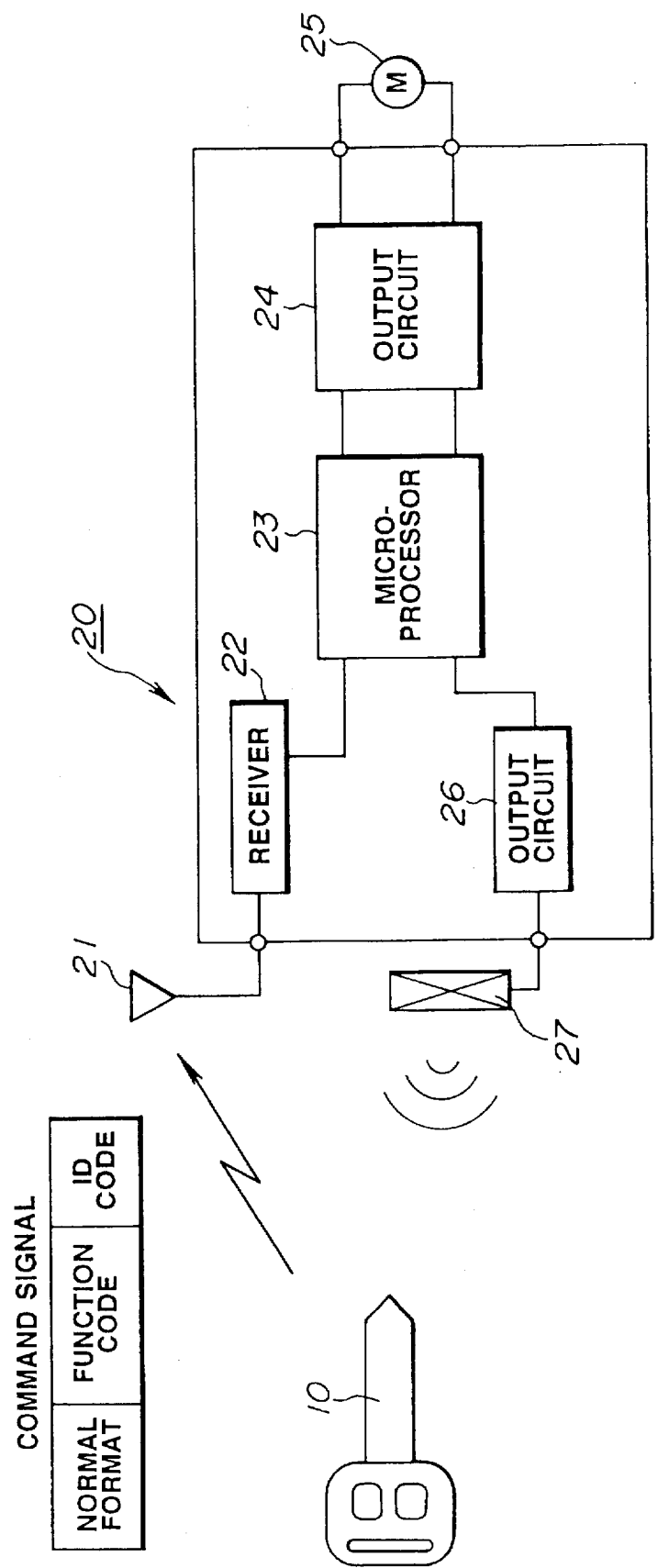
FIG. 1 is a schematic diagram showing a first embodiment of a keyless entry system made in accordance with the invention.

With reference to the drawings and in particular to FIG. 1, there is shown one embodiment of a keyless entry system of the invention. The keyless entry system employs a mobile transmitter 10 shown as built in an ignition key for transmitting a command signal to a keyless entry control unit 20. The command signal includes a normal format, a function code and an ID code. The keyless entry control unit 20 has an antenna 21, a receiver 22, a micro-processor (CPU) 23, a first output circuit 24 connected to drive a door lock actuator 25, and a second output circuit 26 connected to drive a buzzer 27. The receiver 22 receives the command signal transmitted to the antenna 21 from the mobile transmitter 10. The received command signal is fed from the receiver 22 to the micro-processor 23 which analyzes the received command signal. In greater detail, the micro-processor 23 compares the received ID code included in the received command signal with a predetermined ID code registered therein. If the received and registered ID codes are identical, the micro-processor 23 produces a command causing the first output circuit 24 to drive the door lock actuator 25 in a manner specified by the function code included in the received command signal. For example, the first output circuit 24 operates the door lock actuator 25 in a direction to lock the vehicle doors if the function code specifies this operation and in a direction to unlock the vehicle doors if the function code specifies this operation. The micro-processor 23 also produces a command causing the second output circuit 26 to drive the buzzer 27 so as to provide a sound indication as to whether the received ID is identical with the registered ID code or whether the received function code is correct. Preferably, the buzzer 27 is operated in four different modes. For example, the first mode is selected to produce no sound when the received and registered ID codes are identical and when the function code is correct. The second mode is selected to produce a continuous sound when the received and registered ID codes are identical and when the function code is incorrect. The third mode is selected to produce intermittent long sounds when the received and registered ID codes are not identical and when the function code is correct. The fourth mode is selected to produce intermittent short sounds when the received and registered ID codes are not identical and when the function code is incorrect.

In this embodiment, the keyless entry control unit 20 produce an indication corresponding to the result of judgement of the ID and function codes included in the received command signal. This permits the operator to judge which one of the mobile transmitter 10 and the keyless entry control unit 20 is subject to failure when the keyless entry control system does not operate in order. For example, the keyless entry system may be subject to failure because of a trouble in the mobile transmitter 10 when a sound(s) is produced from the buzzer 27. The keyless entry system may be subject to failure because of a trouble in the keyless entry control unit 20 when no sound is produced from the buzzer 27. Furthermore, it is possible to judge which one of the ID and function codes is incorrect according to the kind of the sound(s) produced from the buzzer 27. It is also possible to judge whether the keyless entry control unit 20 operates in order even when the ID code specified for the mobile transmitter 10 is not registered in the keyless entry control unit 20.

Figure 2:
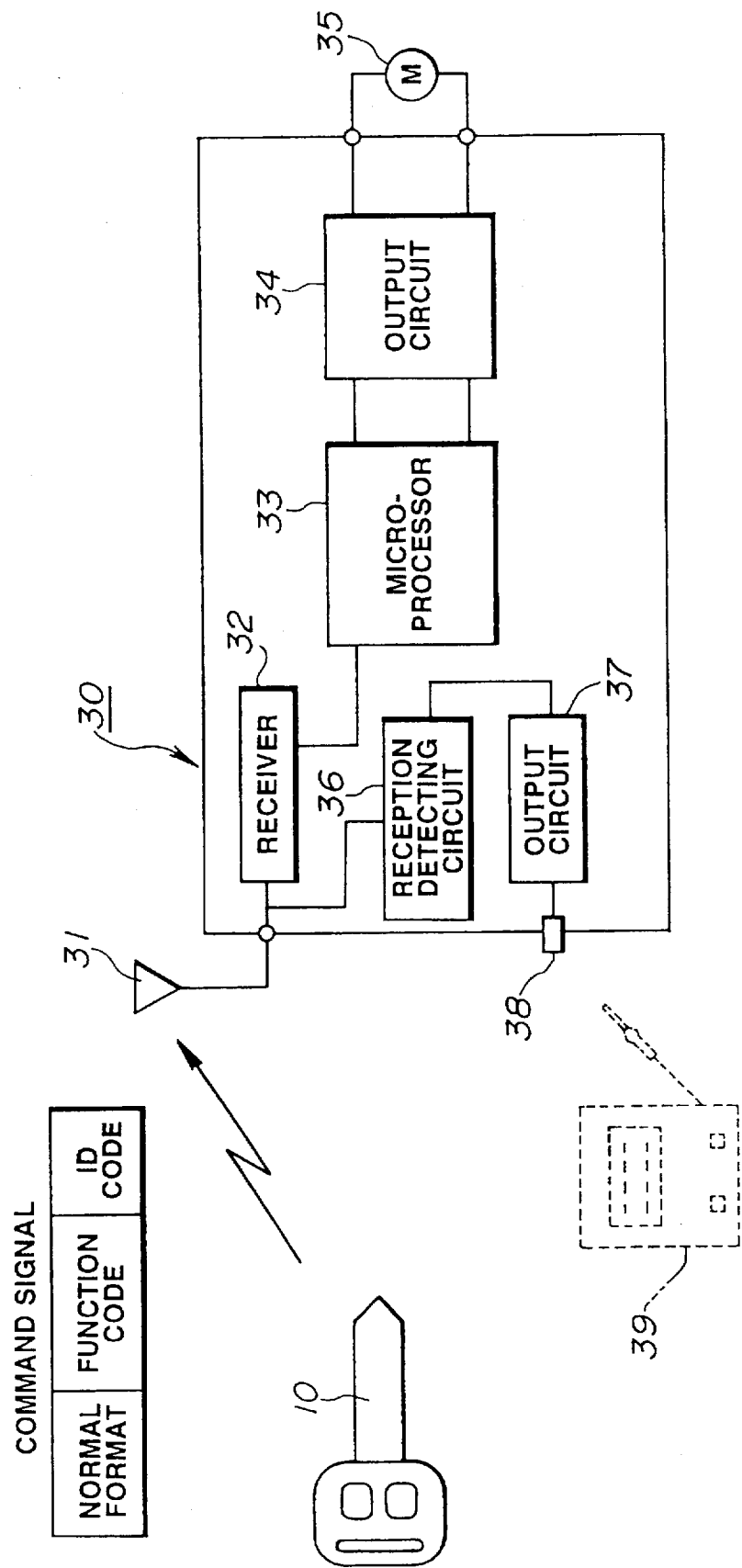
FIG. 2 is a schematic diagram showing a second embodiment of the keyless entry system of the invention.

Referring to FIG. 2, there is shown a second embodiment of the keyless entry system of the invention. In this embodiment, the keyless entry control unit, generally designated by the numeral 30, has an antenna 31, a receiver 32, a micro-processor (CPU) 33, a first output circuit 34 connected to drive a door lock actuator 35, and a signal reception detector circuit 36, and a second output circuit 37 connected to an output terminal 38 held normally at a predetermined potential, for example, 0 volts. The receiver 32 receives the command signal transmitted to the antenna 31 from the mobile transmitter 10. The received command signal is fed from the receiver 32 to the micro-processor 33 which analyzes the received command signal. In greater detail, the micro-processor 33 compares the received ID code included in the received command signal with a predetermined ID code registered therein. If the received and registered ID codes are identical, the micro-processor 33 produces a command causing the first output circuit 34 to drive the door lock actuator 35 in a manner specified by the function code included in the received command signal. For example, the first output circuit 34 operates the door lock actuator 35 in a direction to lock the vehicle doors if the function code specifies this operation and in a direction to unlock the vehicle doors if the function code specifies this operation.

The signal reception detector circuit 36 monitors the command signal fed from the antenna 31 to the receiver 32 and provides a control signal to the second output circuit 36 upon the reception of the command signal. The second output circuit 37 responds to the control signal fed thereto from the signal reception detector circuit 36 by changing the potential of the output terminal 38 to a predetermined value, for example, 5 volts. It is, therefore, possible to detect reception of the command signal with the use of a tester 39 or the like to check the potential of the output terminal 38.

In this embodiment, the keyless entry control unit 30 produce an indication upon the receipt of the command signal transmitted from the mobile transmitter 10. This permits the operator to judge which one of the mobile transmitter 10 and the keyless entry control unit 30 is subject to failure when the keyless entry control system does not operate in order. For example, the keyless entry system may be subject to failure because of a trouble in the mobile transmitter 10 when no change occurs in the potential of the output terminal 38. The keyless entry control unit 30 may be subject to failure when the keyless entry system does not operate in order in spite of a change of the potential of the output terminal 38.

Figure 3:
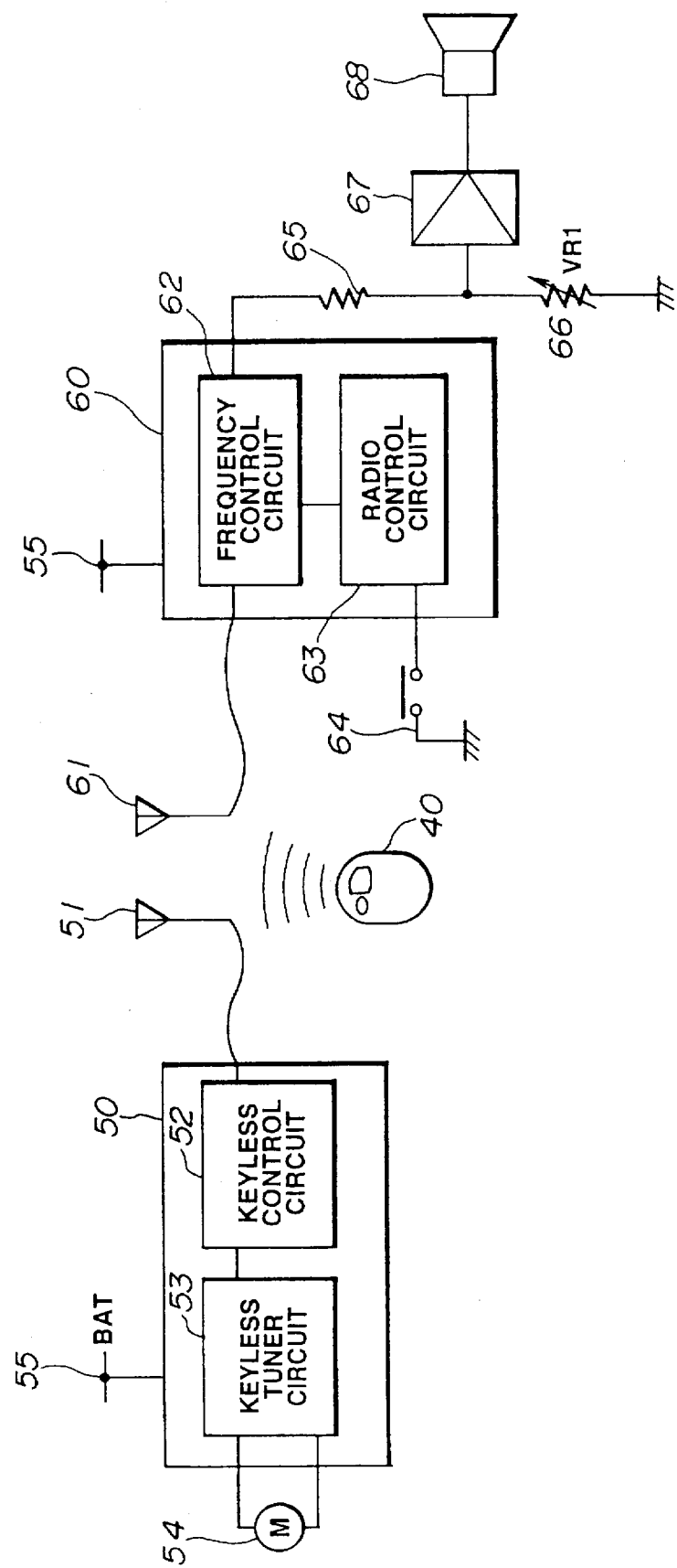
FIG. 3 is a schematic diagram showing a third embodiment of the keyless entry system of the invention.

Referring to FIG. 3, there is shown a third embodiment of the keyless entry system of the invention. The keyless entry system employs a mobile transmitter 40 having door lock/unlock buttons. The door lock button is depressed to produce a command signal which includes a function code causing the vehicle doors to be locked along with an ID code specified for the mobile transmitter 40. The door unlock button is depressed to produce a command signal which includes a function code causing the vehicle doors to be unlocked along with the ID code specified for the mobile transmitter 40.

The keyless entry system includes a keyless receiver unit 50 which includes an antenna 51, a keyless tuner 52 and a keyless control circuit 53 connected to drive a door lock actuator 54. The keyless receiver 50 is powered from a car battery 55. The keyless tuner 52 receives the command signal transmitted to the antenna 51 from the mobile transmitter 50. The keyless tuner 52 converts the received command signal into the form of receiver signal information by detecting the received command signal and then shaping its waveform. The receiver signal information is fed from the keyless tuner 52 to the keyless control circuit 53 which compares the received ID code included in the receiver signal information with a predetermined ID code registered therein. If the received and registered ID codes are identical, the keyless control circuit 53 produces a command causing the door lock actuator 54 to operate in a manner specified by the function code included in the receiver signal information. For example, the keyless control circuit 53 operates the door lock actuator 54 in a direction to lock the vehicle doors if the function code specifies this operation and in a direction to unlock the vehicle doors if the function code specifies this operation.

The keyless entry system also includes another receiver unit 60 which may be a car radio installed on the vehicle. The receiver unit 60 includes an antenna 61, a frequency control circuit 62, a radio control circuit 63, a channel switch 64, a resistor 65, a variable resistor 66, an amplifier 67 and a loudspeaker 68. The receiver unit 60 is powered from the car battery 55. The frequency control circuit 62 receives radio waves through the antenna 61 from AM and FM. broadcasting stations. The radio control circuit 63 employs a digital computer which may be considered as including a central processing unit (CPU), a random access memory (RAM), a read only memory (ROM) and an input/output control circuit. The read only memory contains the program for operating the central processing unit. The random access memory contains a number of reception channels stored therein. One of the reception channels is selected according to an operator's command inputted through channel selection switches (not shown). The stored reception channel includes a special channel for reception of the command signal transmitted from the mobile transmitter 40. This special reception channel is selected when the channel switch 64 is depressed. It is to be understood, of course, that the radio control circuit 63 may be arranged to select the special reception channel upon the simultaneous depression of some of the channel selection switches. In this case, the channel switch 64 is removed. The radio control circuit 63 instructs the frequency control circuit 62 to receive a radio-frequency band corresponding to a selected one of the reception channels. The frequency control circuit 62 converts the received radio-frequency signal into a corresponding audio signal. When the special reception channel is selected, the command signal received by the frequency control circuit 62 is detected as a noise sound. The audio or noise-sound signal is fed from the frequency control circuit 62 through a voltage divider circuit comprised of the resistors 65 and 66 to the amplifier 67 which excites the loudspeaker 68. The variable resistor 66 is operated to adjust the sound level of the loudspeaker 68.

Assuming now that the receiver unit 60 operates in order, the keyless entry system may be checked by the following operations made in the following order: (1) the receiver unit 60 is powered, (2) the channel switch 64 is depressed to select the special reception channel, and (3) the door unlock button of the mobile transmitter 40 is depressed. If no noise sound is produced from the loudspeaker 68, it is indicated that the mobile transmitter 40 is subject to failure for any number of reasons. In this case, the operator will check the mobile transmitter 40. If a noise sound is produced from the loudspeaker 68, it is indicated that the mobile transmission 40 operates in order. In this case, the operator will check the keyless receiver unit 50.

Figure 4:
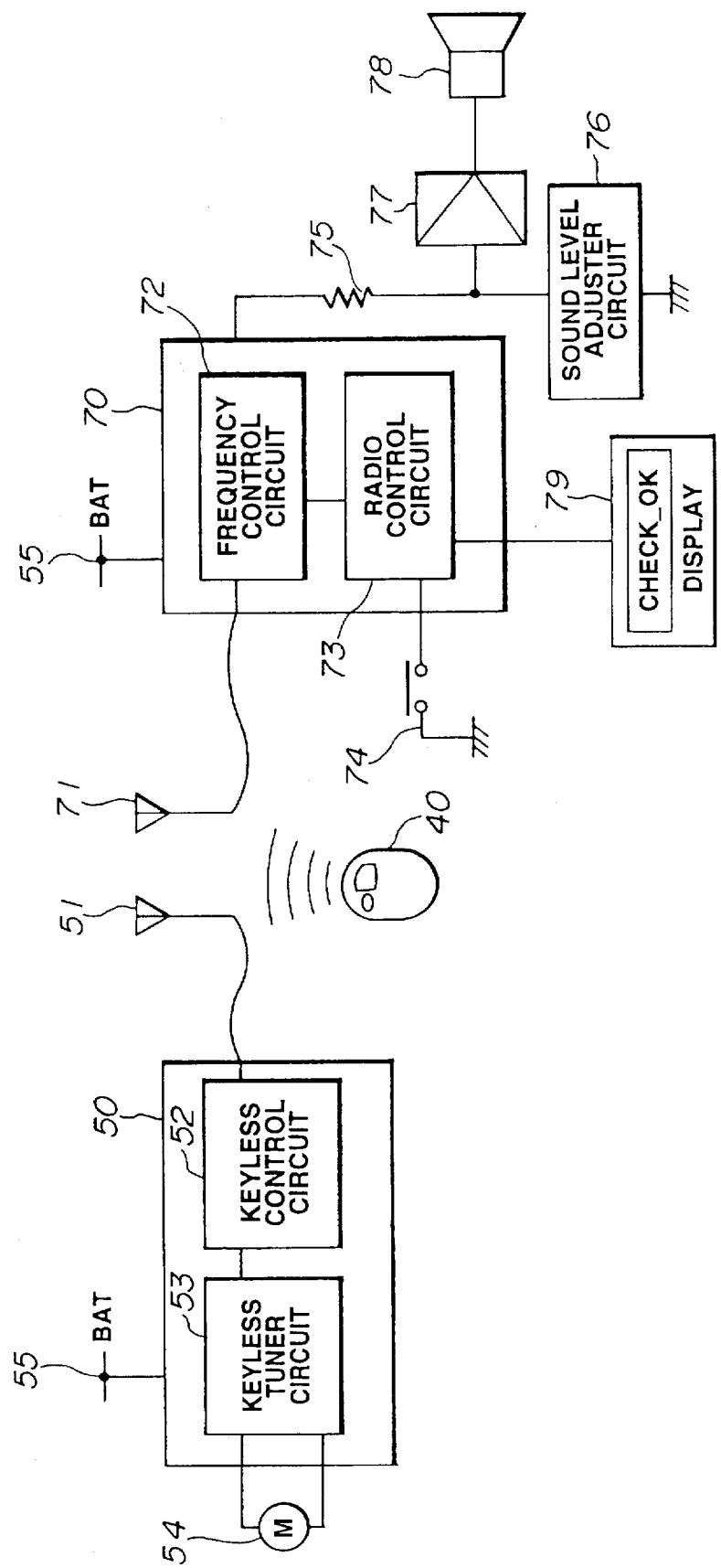
FIG. 4 is a schematic diagram showing a modified form of the receiver unit of FIG. 3.

Referring to FIG. 4, there is shown a modified form of the receiver unit used in the keyless entry system of FIG. 3. In this modification, the receiver unit 70 includes an antenna 71, a frequency control circuit 72, a radio control circuit 73, a channel switch 74, a resistor 75, a sound level adjuster circuit 76, an amplifier 77, a loudspeaker 78 and a display 79. The receiver unit 70 is powered from the car battery 55. The frequency control circuit 72 receives radio waves through the antenna 71 from AM and FM broadcasting stations. The radio control circuit 73 employs a digital computer which may be considered as including a central processing unit (CPU), a random access memory (RAM), a read only memory (ROM), a timer, and an input/output control circuit. The read only memory contains the program for operating the central processing unit. The random access memory contains a number of reception channels stored therein. One of the reception channels is selected according to an operator's command inputted through channel selection switches (not shown). The stored reception channel includes a special channel for reception of the command signal transmitted from the mobile transmitter 40. This special reception channel is selected when the channel switch 74 is depressed. It is to be understood, of course, that the radio control circuit 73 may be arranged to select the special reception channel upon the simultaneous depression of some of the channel selection switches. In this case, the channel switch 74 is removed. The radio control circuit 73 instructs the frequency control circuit 72 to receive a radio-frequency band corresponding to a selected one of the reception channels. The frequency control circuit 72 converts the received radio-frequency signal into a corresponding audio signal. When the special reception channel is selected, the command signal received by the frequency control circuit 72 is detected as a noise sound. The audio or noise-sound signal is fed from the frequency control circuit 72 through the resistor 75 to the amplifier 77 which excites the loudspeaker 78. The sound level adjuster circuit 76 is connected to adjust the sound level of the loudspeaker 78. This sound level adjustment is made based on sound level information produced from the radio control circuit 73 to the sound level adjuster circuit 76. The radio control circuit 73 produces a character message which is displayed on the display 79 to indicate the inputted code information.

Figure 5:
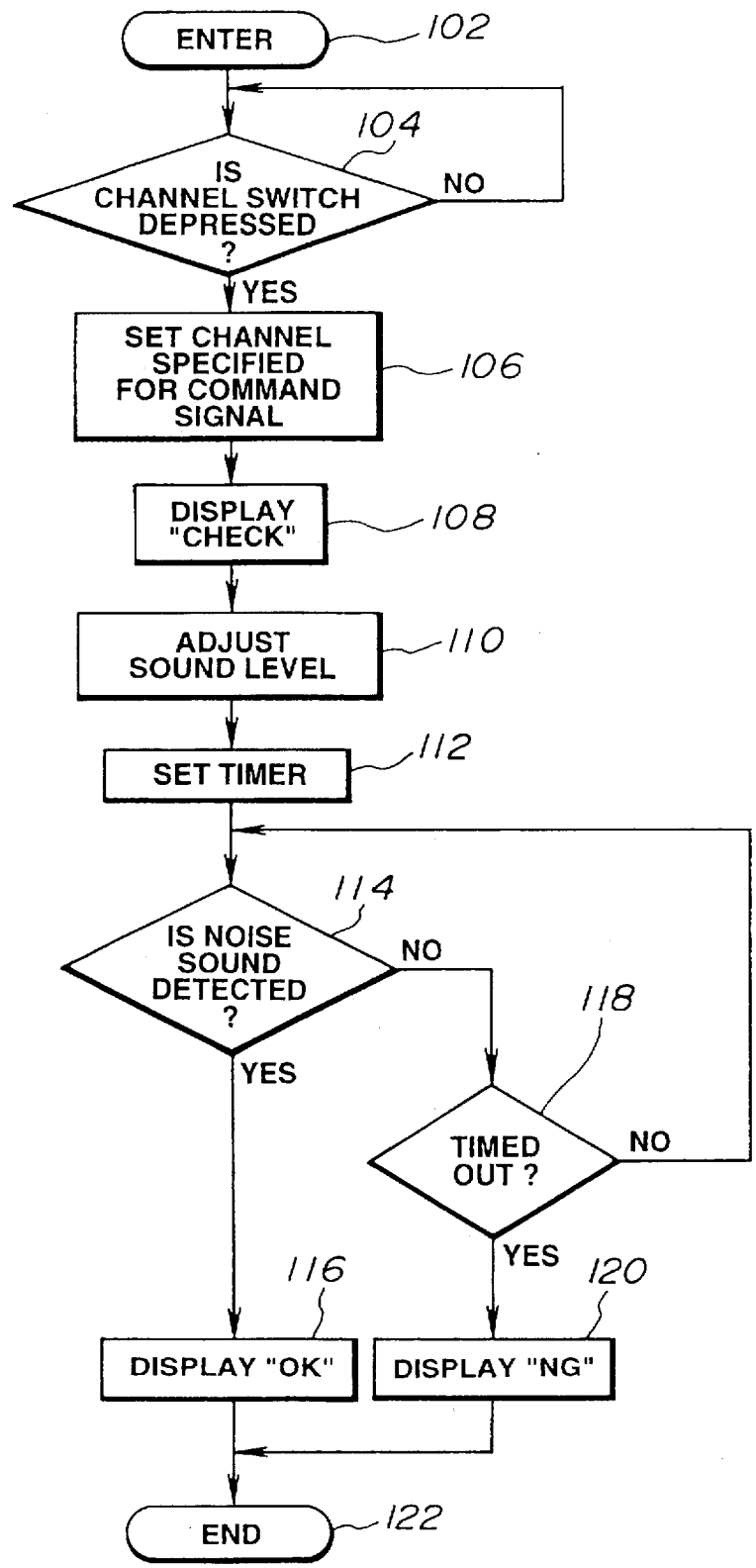
FIG. 5 is a flow diagram showing the programming of the digital computer as it is used to check the mobile transmitter.

FIG. 5 is a flow diagram showing the programming of the digital computer as it is used in the radio control circuit 73 to display information as to whether or not the mobile transmitter 40 operates in order. The computer program is entered at the point 102. At the point 104 in the program, a determination is made as to whether or not the channel switch 74 is depressed. If the answer to this question is "yes", then the program proceeds to the point 106. Otherwise, the program is returned to the point 104. At the point 106, the special channel is selected for reception of the command signal transmitted from the mobile transmitter 40. At the point 108 in the program, a command is produce to display "CHECK" on the display 79 to indicate that the receiver unit 60 is in a mode checking the mobile transmitter 40. At the point 110, a command is produced to adjust the sound level to an extent sufficient for the operator to hear the noise sound. At the point 112, a command is produced to set the timer.

At the point 114 in the program, a determination is made as to whether or not there exists a noise-sound signal exceeding a predetermined level. If the answer to this question is "yes", then it means that the receiver unit 70 has received the command signal transmitted from the mobile transmitter 40 and the program proceeds to the point 116 where a command is produced to display "OK" on the display 79 to indicate that the mobile transmitter 40 operates in order. Otherwise, the program proceeds to another determination step at the point 118. This determination is as to whether or not the timer is timed out. If the answer to this question is "yes", then it means that a predetermined time T1, for example, 60 seconds, has elapsed for noise sound detection and the program proceeds to the point 120. Otherwise, the program is returned to the point 114. At the point 120 in the program, a command is produced to display "NG" on the display 79 to indicate that the mobile transmitter 40 is subject to failure. Following this, the program proceeds to the end point 122.

In this modification, the display 79 is used to provide an indication as to whether or not the mobile transmitter 40 operates in order, it is to be understood that a buzzer or light may be used for this purpose.

What is claimed is:

1. A keyless entry system for use with an automotive vehicle, comprising:
   a mobile transmitter for transmitting a command signal including an ID code specified therefor along with a function code for a vehicle door lock/unlock remote control; and
   a control unit for receiving the command signal transmitted from the mobile transmitter, the control unit including
   means for comparing the received ID code with an ID code registered therein to permit the remote control specified by the received function code when the received function code is correct and the received and registered ID codes are identical,
   means for checking the received function code, and
   means for providing two different indications including a first indication when the received and registered ID codes are not identical and the received function code is correct and a second indication when the received and registered ID codes are not identical and the received function code is incorrect.

2. The keyless entry system as claimed in claim 1, wherein the control unit includes means for providing an indication when the received function code is incorrect.

3. The keyless entry system as claimed in claim 1, wherein the control unit includes means for providing a third indication, different from the first and second indications, when the received and registered ID codes are identical and the received function code is incorrect.

4. The keyless entry system as claimed in claim 1, wherein the control unit includes means for providing an indication upon reception of the command signal transmitted from the mobile transmitter.

5. The keyless entry system as claimed in claim 4, wherein the indication providing means includes a terminal maintained at a predetermined potential in the absence of the received command signal, and means for changing the potential of the terminal in the presence of the received command signal.

6. A keyless entry system for a vehicle, comprising:
   a transmitter for transmitting a command signal including an ID code and a function code for a vehicle remote control; and
   a control unit for receiving the command signal transmitted from the transmitter, the control unit further comprising:
   a circuit to compare the received ID code with an ID code registered therein to activate the remote control specified by the received function code when the received function code is correct and the received and registered ID codes are identical,
   a circuit to check the received function code, and
   a circuit to provide a first indication when the received and registered ID codes are not identical and the received function code is correct, and a second indication when the received and registered ID codes are not identical and the received function code is incorrect.

7. The keyless entry system as claimed in claim 6, wherein the control unit includes a circuit to indicate when the received function code is incorrect.

8. The keyless entry system as claimed in claim 6, wherein the control unit includes a circuit to provide a third indication when the received and registered ID codes are identical and the received function code is incorrect.

9. The keyless entry system as claimed in claim 6, wherein the control unit includes a circuit for providing an indication upon reception of the command signal transmitted from the transmitter.

* * * * *